United States Patent [19]

Frank et al.

[11] Patent Number: 5,175,600
[45] Date of Patent: Dec. 29, 1992

[54] COLLIMATOR MOUNTING MEANS ADAPTED FOR ATTACHMENT TO MISSILE LAUNCHER

[76] Inventors: Jack D. Frank, 505 W. 5th #108, Long Beach, Calif. 90802; Gustav Hubert, 8427 Leroy St., San Gabriel, Calif. 91775

[21] Appl. No.: 541,682

[22] Filed: Jun. 21, 1990

[51] Int. Cl.⁵ ............................................. G01B 11/26
[52] U.S. Cl. ..................................... 356/153; 89/1.1; 89/1.816
[58] Field of Search ................... 356/138, 153; 89/1.8, 89/1.816, 1.819, 1.1

[56] References Cited

U.S. PATENT DOCUMENTS 4,581,977 4/1986 Ross et al. ........................... 356/153

Primary Examiner—F. L. Evans

[57] ABSTRACT

A collimator mounting assembly adapted for attachment to a missile launcher having a pivot member, called a traversing unit, at the apex of a tripod, that is adapted to replace a horizontally-oriented missile launching tube on the pivot member, and includes a mechanism for attaching the collimator mounting unit to the traversing unit, and adjustable tilt, azimuth, and elevation-controllable support plates for a tubular, horizontally-oriented collimator. This assembly permits the optical axis of the collimator placed atop the assembly to be parallel to the longitudinal axis of the missile launch tube, and permits referencing the collimator optical axis to the boresight of the missile launch tube.

8 Claims, 6 Drawing Sheets

COLLIMATOR MOUNTING MEANS ADAPTED FOR ATTACHMENT TO MISSILE LAUNCHER

BACKGROUND OF THE INVENTION

1. Field of the Invention

This invention relates to collimator mounting means adapted for attachment to a missile launcher and adapted to position the line of sight of a collimator relative to the boresight or centerline of the missile launch tube. The collimator is a device which projects simulated targets into the optical sights of the missile launcher.

2. Description of Related Art

Until now, collimator mounting means for use in testing the accuracy of a missile launcher boresight such as in the TOW missile launcher, were attached to a reference surface on the optical sight or were externally mounted and aligned to the optical sight. Separate devices, such as periscopes and telescopes, were used to relay or transfer the centerline of the launch tube to the collimator to permit measuring the angle of the launch tube relative to the optical sight.

Such mounting means sometimes resulted in inaccurate results, in part because of difficulties in referencing the centerline of the launch tube to the collimator.

SUMMARY OF THE INVENTION

This invention relates to a collimator mounting means for an optical test instrument, called a collimator, that is used to measure the line of sight (LOS) of three optical sight instruments on a missile launcher and the angle of the longitudinal centerline of the launch tube of the missile launcher relative to the LOS of the three optical sight instruments.

The optical test instrument that is placed on the collimator mounting means is used to measure the position of the line of sight (LOS) of several optical sensors, and the angle of the launch tube of a missile launcher. The missile launcher includes a missile launch tube and three optical sight instruments. The launch tube has a longitudinal centerline, called the boresight of the launch tube.

In preferred embodiments, the optical sight instruments include a visual telescope, a near infrared optical tracker, and a far infrared viewer and tracker. Each has an optical line of sight (LOS). When the missile launcher is aligned, the three lines of sight are adjusted to be parallel to one another, and the launch tube centerline is adjusted to be pitched up 1.5° in elevation and towed in 0.4° azimuth so the missile flies into the field of view of the three optical sights and is guided under control of these optical sight instruments.

The collimator mounting means is adapted for attachment to a missile launcher traversing unit. The traversing unit is attached to a missile launcher stand, preferably a tripod. The traversing unit is mounted at the apex of the stand, is vertically oriented, and includes a rotatable azimuth pivot and a rotatable elevation pivot. The traversing unit is adapted to receive a horizontally-oriented missile launching tube. The collimator mounting means includes means for attaching the mounting means to the traversing unit. The collimator mounting means is substantially similar to the means for attaching a missile launching tube to the traversing unit so that the two can be interchanged.

In use, the missile launch tube is removed, and the collimator mounting means is substituted in its place. An optical collimator is then attached to the collimator mounting means, and is used to project simulated targets into the three optical sight instruments. The optical sight instruments measure the angle of the missile launch tube relative to the three lines of sight. An external electronic test device converts electrical angle signals into digital information so that a computer can determine if these angles are within desired tolerance limits.

The new collimator mounting means includes means for attaching the collimator mounting means to the traversing unit on the missile launcher; adjustable means for supporting tubular, horizontally-oriented collimator means; and horizontally-oriented tubular means joined, near a first end of the tubular means, to the attaching means and joined, near a second end of the tubular means, to adjustable plates for supporting, and, in preferred embodiments, adjusting the elevation, tilt and azimuth angles of the tubular, horizontally-oriented collimator mounting means.

In preferred embodiments, the attaching means comprises plate means having an opening adapted to receive horizontally-oriented, tubular means. The plate means also includes projection means, preferably cylindrically-shaped pins, adapted to engage complementary-shaped openings in the vertically-oriented, rotatable pivot means of the traversing unit in the missile launching means.

In preferred embodiments, the horizontally-oriented tubular means that is adapted to be received in the attaching means is a cylindrically-shaped tube, preferably made of a metal such as steel or aluminum. One end of the tube is received in the opening of plate means that forms part of the attaching means. Near the other end of this horizontally-oriented tubular means are the adjustable plates for supporting and adjusting the elevation, tilt and azimuth of the tubular-shaped, horizontally-oriented collimator means.

In preferred embodiments, the means for adjusting the elevation angle of the plate means comprises first plate means hingedly connected to second plate means on or along one side of the first and second plate means. On another side of the first plate means is a rotatable adjustment screw means that passes through a threaded opening in the second side of the first plate means, and engages the bottom surface near the edge of the second plate means. Rotation of the rotatable adjustment screw means causes the second plate to move upwardly or downwardly in small, controllable increments, thus permitting both coarse and fine adjustment of the elevation angle of the plates that lie above, and are connected to the first and second plate means.

In preferred embodiments, the means for adjusting the tilt angle of the platform means, namely the angle around the longitudinal axis of the missile launch tube, comprises third plate means hingedly connected to the second plate means along a side of the second plate means and the third plate means. On the side of the second plate means is a threaded opening for receiving rotatable adjustment screw means that pass through this threaded opening and engage the bottom surface of the third plate means, preferably near its edge. By rotating this rotatable adjustment screw means, upwardly and downwardly, the third plate means can be raised or lowered, adjusting the angle of tilt of the third plate means about the hinge pin and the plate means that lie above.

In preferred embodiments, the means for adjusting the azimuth angle of the platform means comprises a fourth plate means that is connected to the third plate means, preferably by a centerpost. A threaded opening in the third plate means for receiving a rotatable adjustment screw passes through the opening, and engages a projection called a paw mounted on the side of the fourth plate means. A spring-loaded pin and support is mounted to the third plate means, and engages the opposite side of the paw mounted on the side of the fourth plate means. By rotating the adjustment screw, the fourth plate means is rotated around the centerpost as is the plate means that lies above.

In preferred embodiments, fifth plate means atop the fourth plate means are provided to receive the collimator. A fixed azimuth position parallel to the missile launch tube boresight is obtained by engaging an azimuth angle setting lock. A fixed elevation position parallel to the missile launch tube boresight is obtained by engaging elevation lock means.

BRIEF DESCRIPTION OF THE DRAWINGS

The new collimator mounting means can better be understood by reference to the drawings, in which.

DETAILED DESCRIPTION OF THE INVENTION

Figures 1, 2:
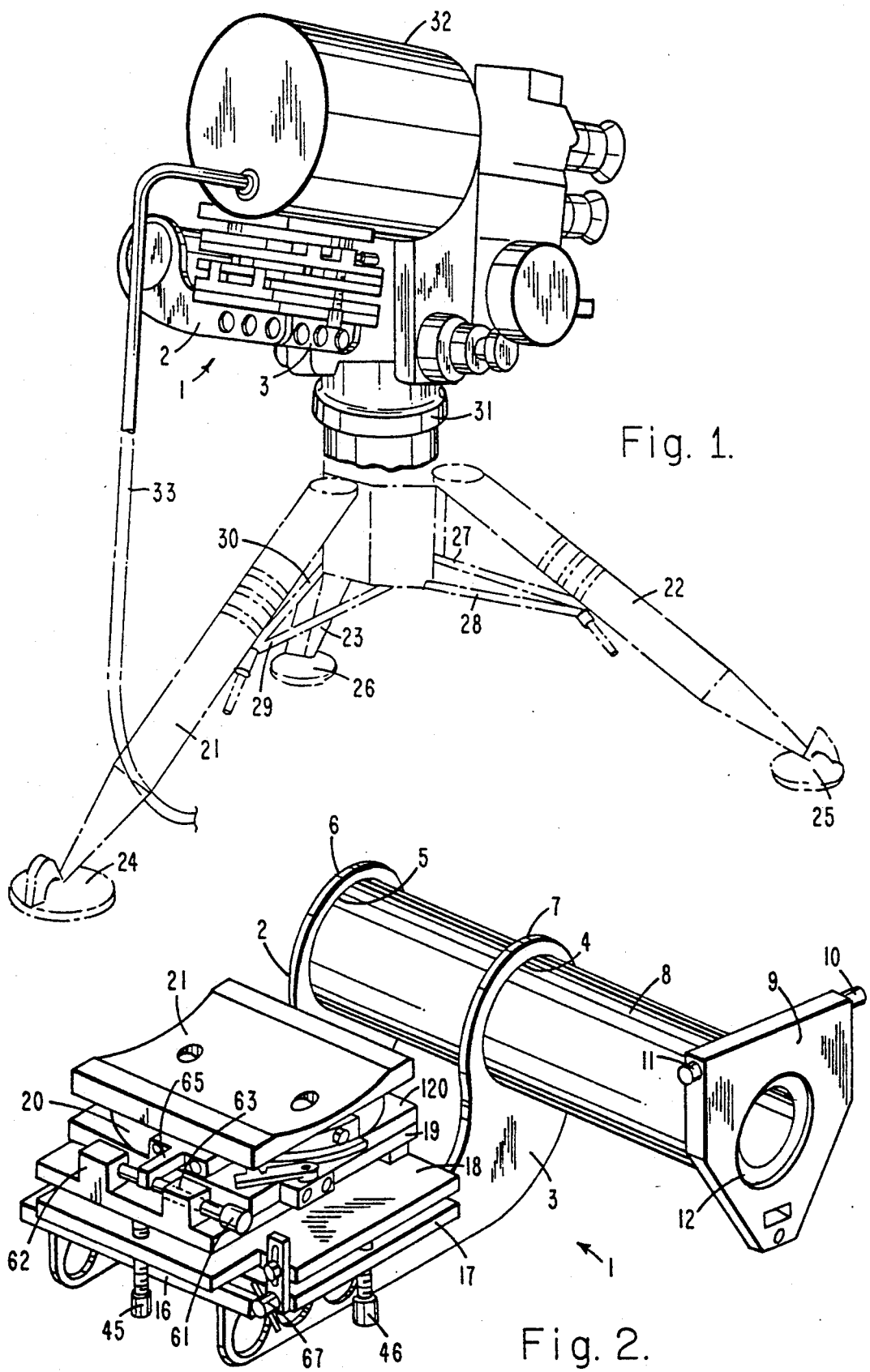
FIG. 1 is a perspective view of a preferred embodiment of a collimator and its mounting means attached to a missile launcher stand that takes the form of a tripod.
FIG. 2 is a perspective view of a preferred embodiment of a collimator mounting means.
Figure 3:
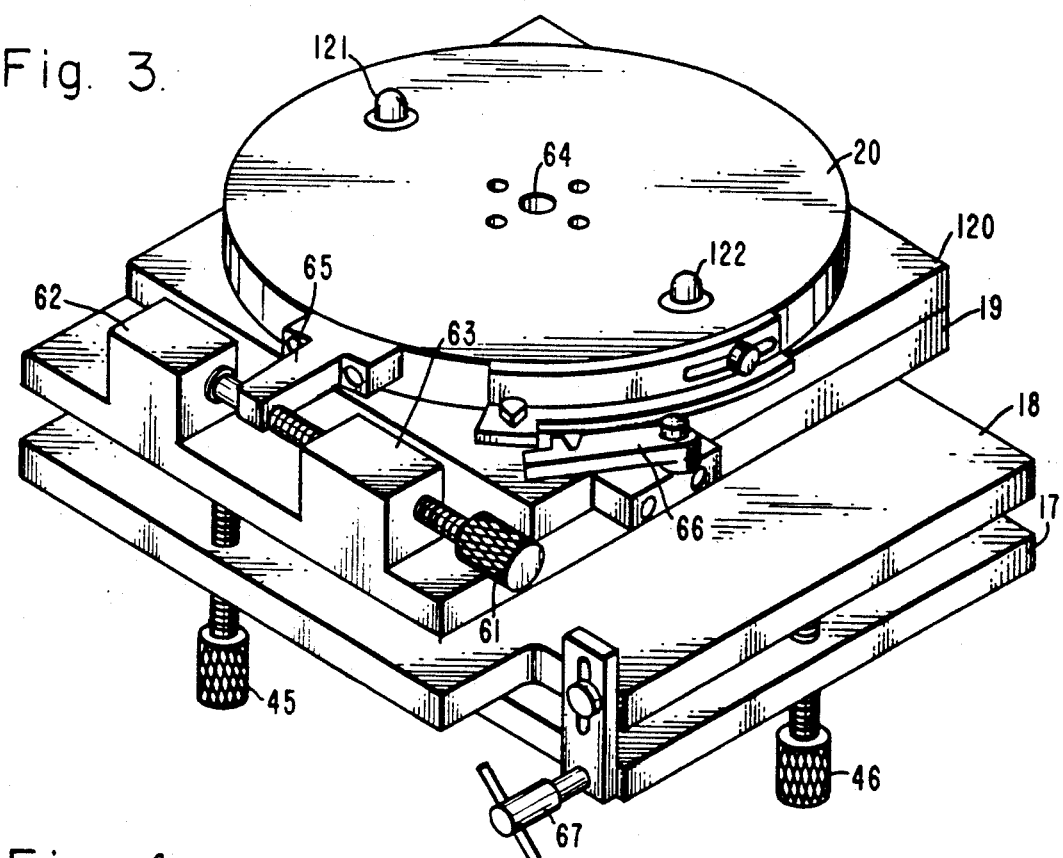
FIG. 3 is a perspective view of a preferred embodiment of the tilt, elevation and azimuth stages of the mounting means shown in FIGS. 1 and 2.
Figure 4:
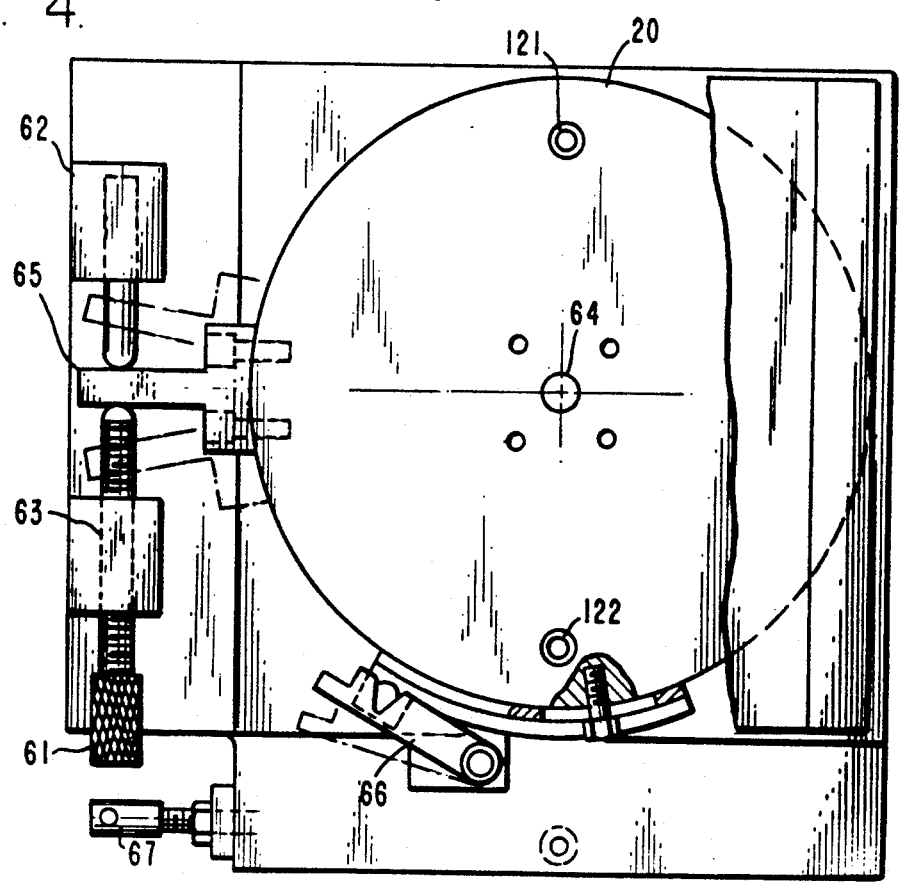
FIG. 4 is a top plan view of the preferred embodiment of the azimuth stage of the collimator mounting means shown in FIGS. 1-3.

FIG. 1 shows a missile launching stand in the form of a tripod that includes three supporting legs 21, 22 and 23 connected to ground-engaging plates 24, 25 and 26, respectively. Leg members 21 and 22 are joined to vertically-oriented centerpost traversing unit 31 through supporting strut members 30, 27, 28 and 29. Attached to vertically-oriented traversing unit 31 is a preferred embodiment of collimator mounting means 1 of this invention. Atop collimator mounting means 1 is collimator 32 that has connector cable 33 joined thereto for passage of signals to and from collimator 32 via cable 33 to an electronic computing unit not shown.

FIGS. 2-5 show the construction of collimator mounting unit 1 in some detail. The collimator mounting unit 1 includes plate member 9 having round opening 12 for receiving and engaging tubular member 8. On the top of plate member 9 are cylindrically-shaped, horizontally-oriented projections 10 and 11 that are adapted to engage complementary-shaped openings in traversing unit 31.

Near the opposite end of tubular member 8 are a pair of supports 6 and 7 having cylindrically-shaped openings 4 and 5 to receive and engage tubular member 8. Supports 6 and 7 include horizontally-extending support members 2 and 3.

Atop support members 2 and 3, and welded thereto, is plate member 16. Atop plate member 16 is plate member 17, which is joined to plate member 16 by screws 47 that fit into threaded openings 48, 49, 50 and 51. Plate member 17 includes, on one side, hinge pin-receiving projections 52 and 53. On the other side of plate 17 is projection 56, which includes a threaded through-hole 56a that receives threaded adjustment screw 46. Rotation of screw 46 provides a desired elevation angle to collimator mounting unit 1.

Hingedly connected to plate member 17 is plate member 18. Hinge pins, such as 54, fit through opening 55 and the opening in hinge projection 52 on plate 17 to hingedly connect plate 18 to plate 17. On the opposite side of plate 18 from hinge pins 54 is tab 58, integrally formed with plate member 18. The elevation angle-adjusting, rotatable screw 46 engages the bottom surface of tab 58 and, by moving upwardly or downwardly, adjusts the elevation angle of the plate members above, and connected to plate 18, upwardly or downwardly, as well as horizontally-oriented collimator tube 32, which rests on curved surface 34 of plate 21.

Hingedly connected to plate member 18, on one side, is plate member 19. Hinge pin 36 enters opening 37 and passes through the opening in hinge projection 44 on plate 18. A similar hinge pin, not shown in FIG. 3, links hinge projection 43 on plate 18 to hinge pin-receiving opening 42. Plate 120 is bolted to the upper surface of plate member 19 with screws, such as screw 38, that fit through openings such as openings 39 and 40, and thread into threaded holes (not shown) at the bottom of plate 120.

Figures 5, 9:
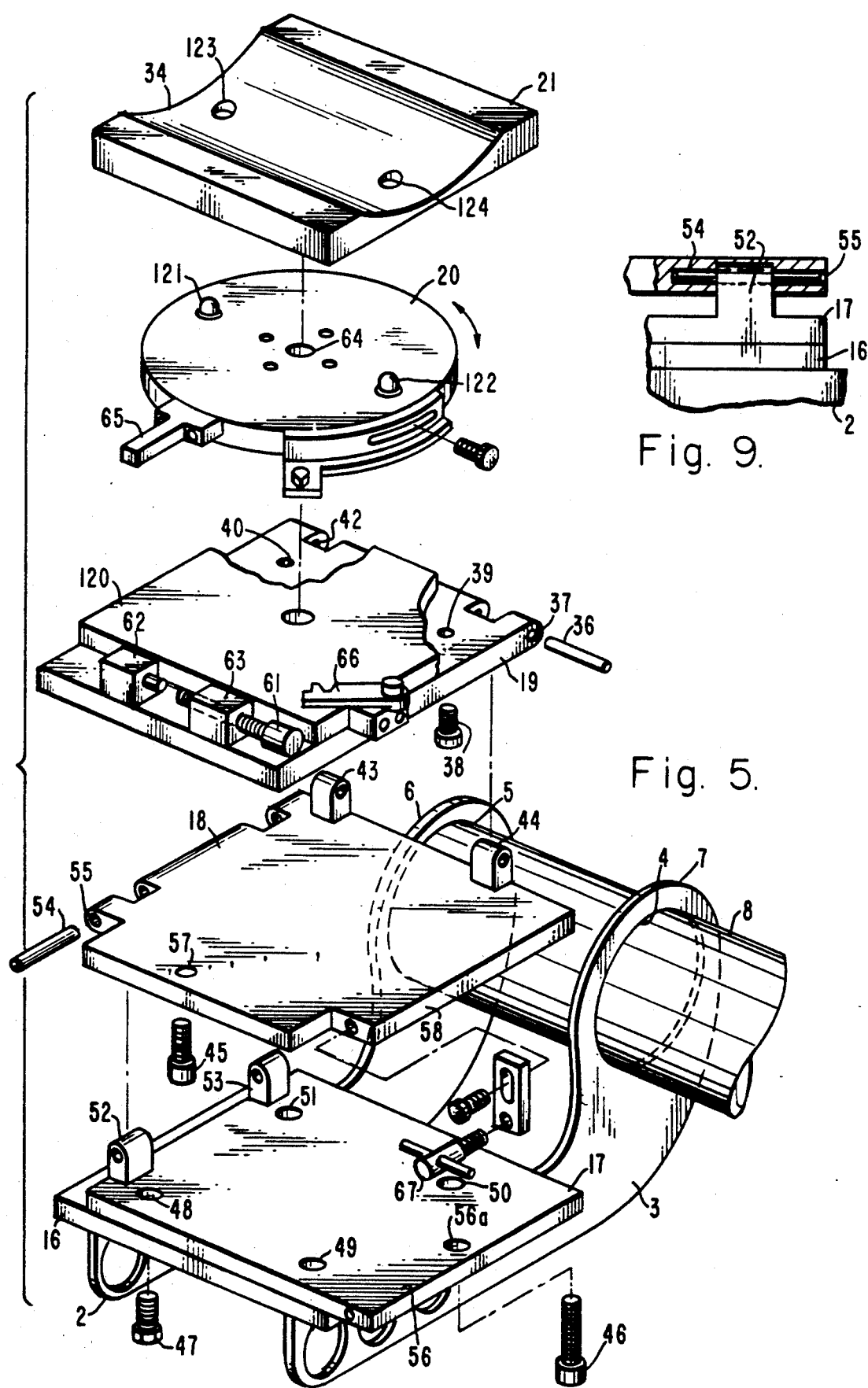
FIG. 5 is an exploded view showing the construction of the preferred embodiment of the tilt, elevation and azimuth stages of the collimator mounting means shown in FIG. 3, and includes the collimator-receiving plate.
FIG. 9 shows a fragmentary view of one of the hinges that provide the tilting mechanism in the preferred embodiment of the collimator mounting means shown in FIGS. 1-7.

Rotatable adjusting screw 45 passes through internally-threaded hole 57 in plate member 18 and engages the undersurface of plate 19 (see FIG. 5). By rotating screw 45 upwardly or downwardly, the angle of mounting unit 1 is tilted around the launch tube boresight upwardly or downwardly as is collimator unit 32 resting atop plate member 21 on curved surface 34.

Figure 6:
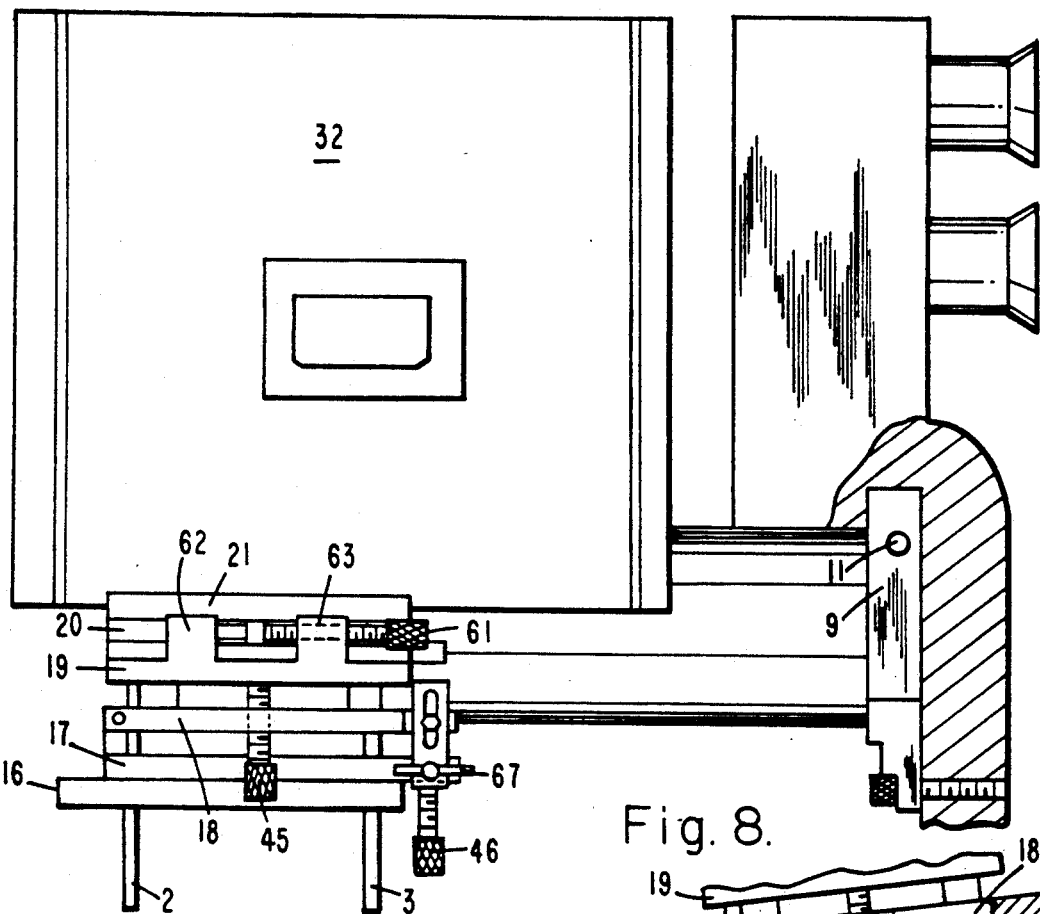
FIG. 6 shows a side elevation view of a collimator, and of the preferred embodiment of the collimator mounting means shown in FIGS. 1-5, as they are attached to the traversing unit of a missile launcher.
Figure 8:
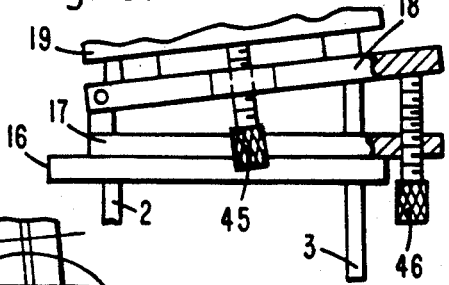
FIG. 8 shows a fragmentary view of one of the hinges, and of the adjustable, rotatable screws that permit changes in elevation angle and tilt angle of the preferred embodiment of the collimator mounting means shown in FIGS. 1-7.
Figure 7:
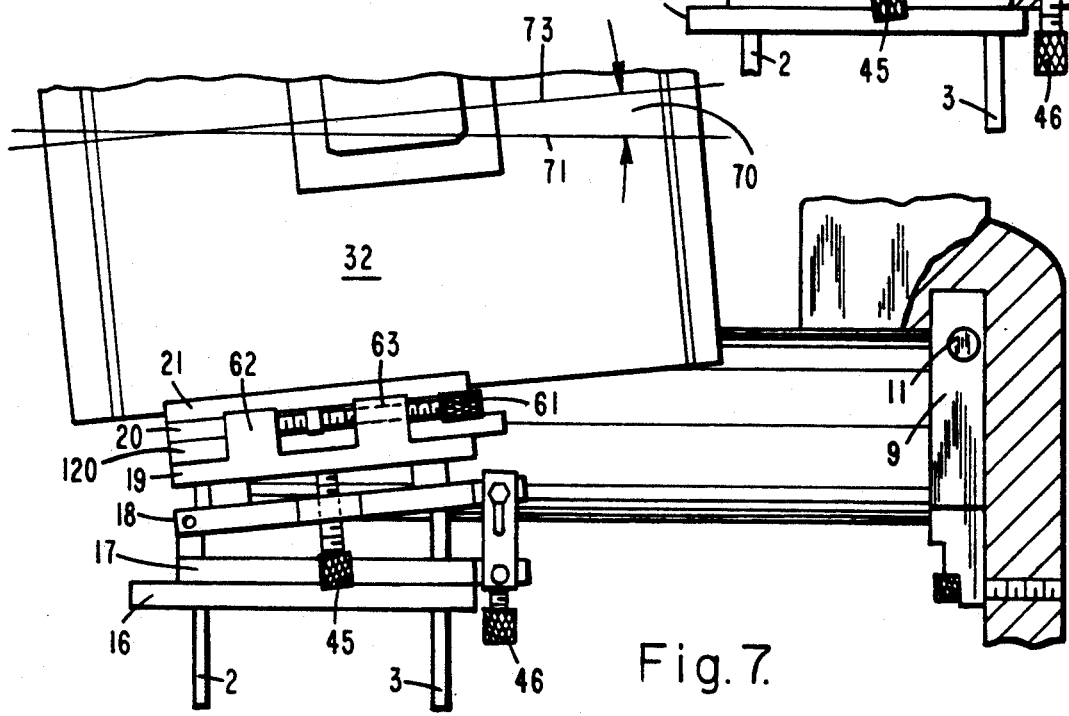
FIG. 7 shows a side elevation view of a collimator and of the preferred embodiment of the collimator mounting means shown in FIGS. 1-5, here with the elevation angle of the mounting means tilted upwardly from the position shown in FIG. 6.

FIGS. 6 and 7 show the collimator mounting means with collimator unit 32 resting atop curved surface 34 on plate member 21. In FIG. 6, rotatable, adjusting screws 45 and 46 engage, but have not moved upwardly either plate member 19 or plate member 18. In FIG. 7, rotatable screw 46 has been rotated upwardly to change the elevation angle of plate members 18, 19, 120, 20 and 21, and collimator unit 32.

Figure 10:
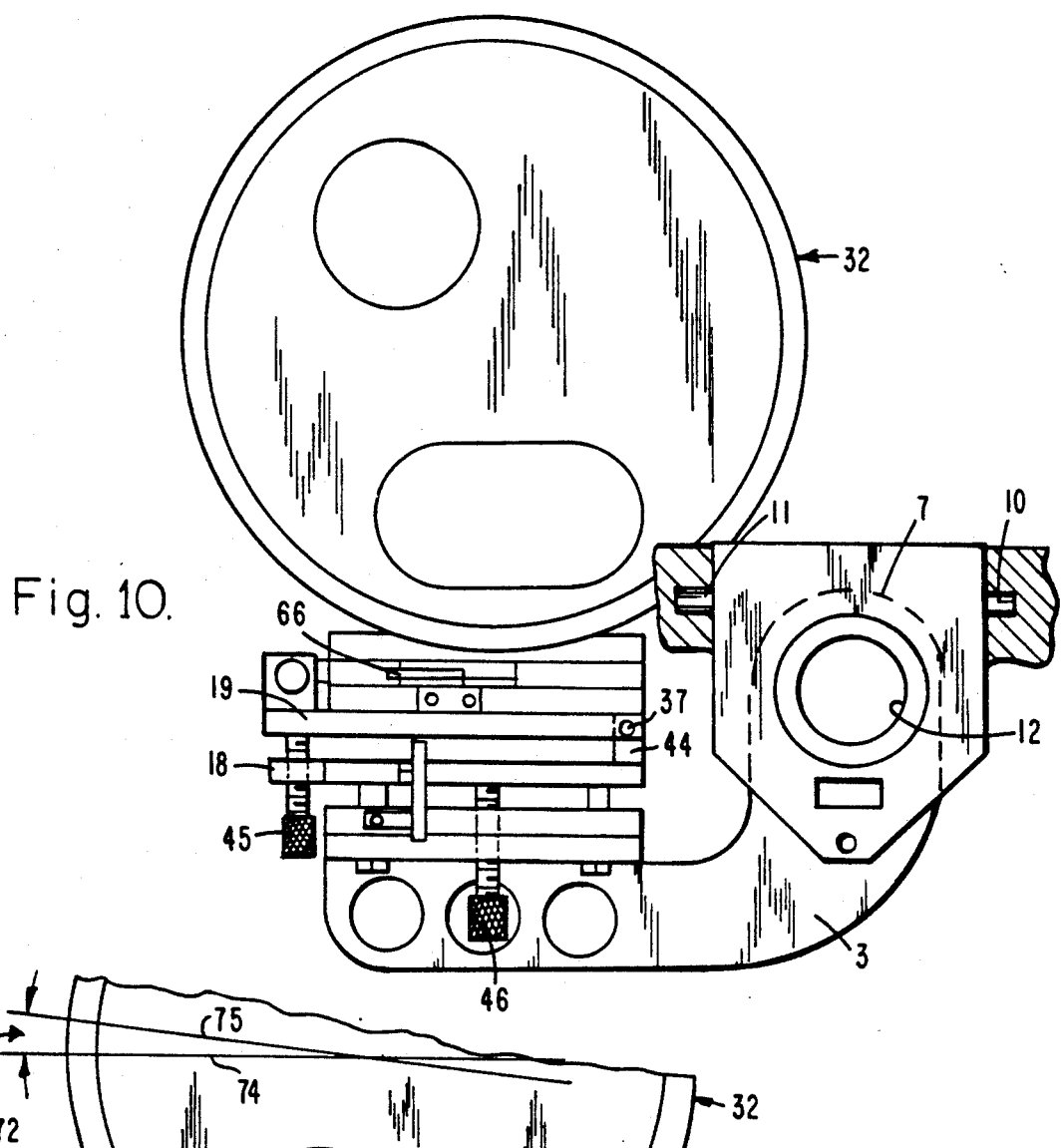
FIGS. 10 and 11 show end elevation views of a collimator, and of the preferred embodiment of the collimator mounting means, with the angle of tilt around the missile launch tube boresight unadjusted (FIG. 10) and adjusted (FIG. 11)
Figure 11:
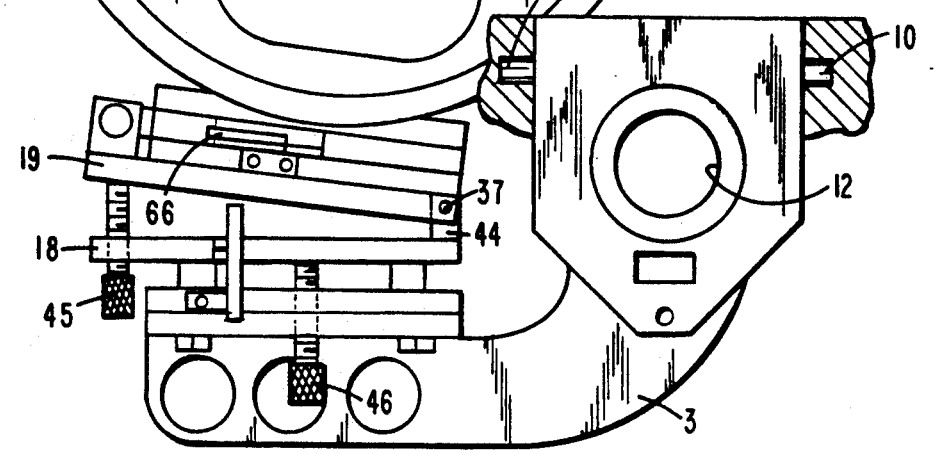

FIGS. 10 and 11 show how the tilting mechanism operates. In FIG. 10, screw 45 has been rotated upwardly to engage the bottom of plate 19 holding it parallel to lower plate 18. In FIG. 11, rotatable screw 45 has been rotated upwardly, pushing plate member 19 upwardly and thus changing the tilt angle of the collimator 32 relative to the launch tube boresight axis.

FIG. 9 provides a detail view of one hinge member 52, hinge pin 54 and hinge-receiving opening 55 in plate member 18.

FIGS. 3-5 and 12 show the mechanisms provided for adjusting the azimuth angle of the platform means. Plate 20 is connected to plate 120 by centerpost 64. Pins 121 and 122 atop plate 20 fit into complementary openings 123 and 124, respectively, in the bottom of plate 21. These pins permit a user to remove and replace plate 21, and a collimator resting atop plate 21 in a proper position repeatedly and accurately. Threaded opening 63 in plate means 19 receives rotatable adjustment screw 61, which passes through an opening and engages paw 65 mounted on the side of plate 20. Spring-loaded pin and support 62 are mounted to plate 120, and engage the opposite side of paw 65 mounted on the side of plate 20. By rotating adjustment screw 61, plate 20 is rotated around centerpost 64, adjusting to the same degree as the azimuth angle of collimator 32 in trough 34.

Plate 21 is provided to mount collimator 32 atop unit 1. A fixed azimuth position parallel to launch tube boresight is obtained when azimuth angle-setting lock 66 is engaged. A selected elevation position parallel to the launch tube boresight is obtained by engaging elevation lock 67.

FIG. 7 shows elevation angle 70 formed between the launch tube boresight axis 71, in the unadjusted position, and missile launch tube boresight axis 73 after the desired elevation angle has been achieved.

FIG. 11 shows the formation of tilt angle 72 between the horizontal axis of the launch tube in its untilted position 74 and its tilted position 75.

Figure 12:
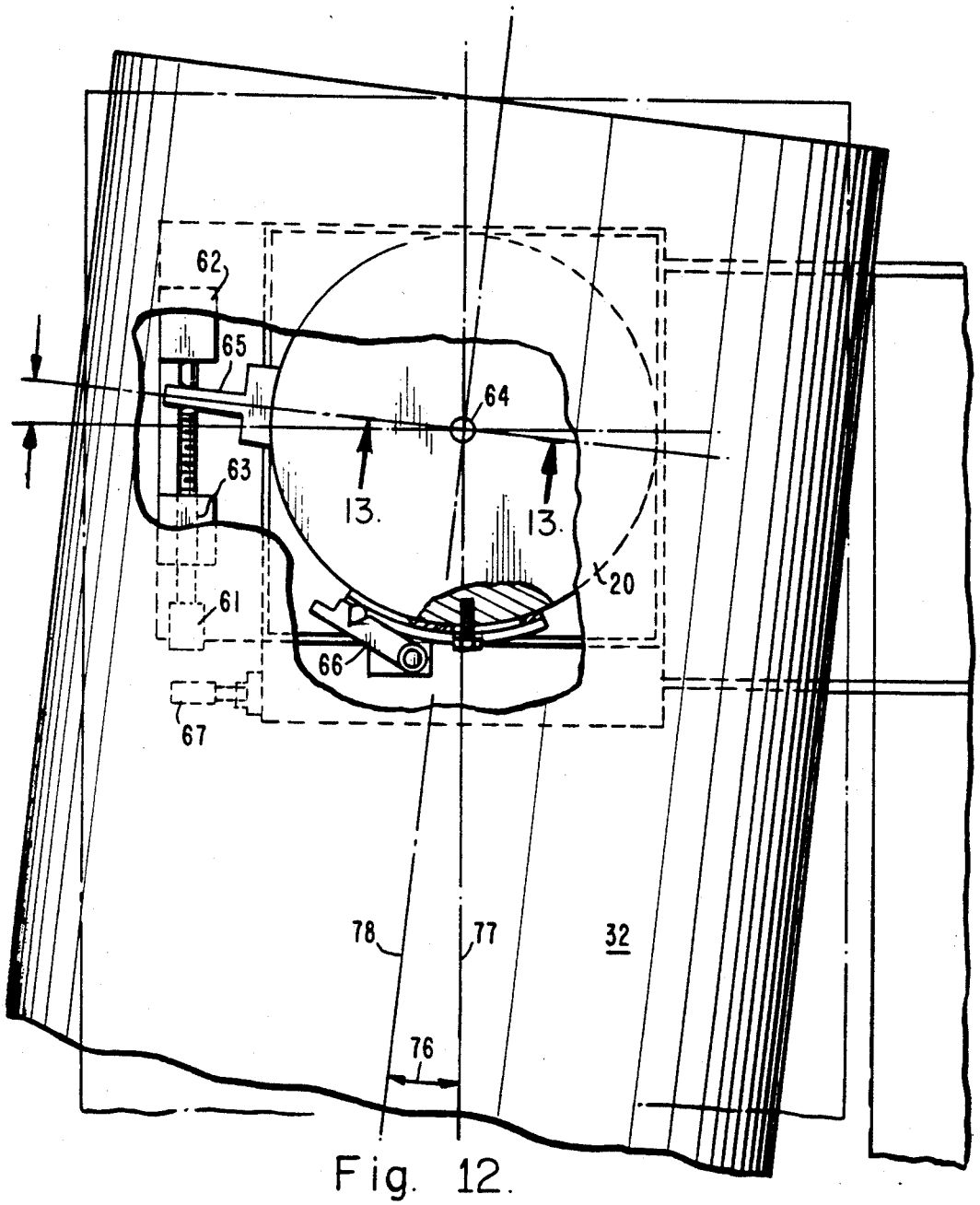
FIG. 12 shows a top plan view of a collimator atop the preferred embodiment of the collimator mounting means, and of the azimuth angle adjustment stage of the collimator mounting means, with the azimuth angle adjusted to a desired position.
Figure 13:
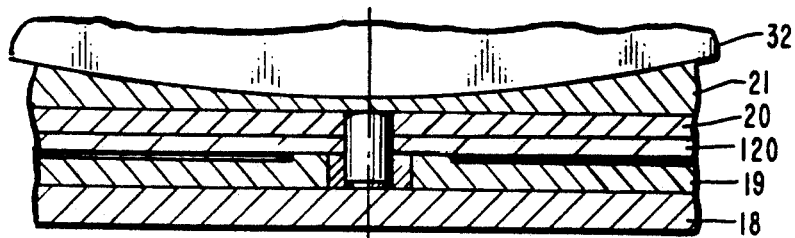
FIG. 13 is a fragmentary view of the plates in the preferred embodiment of the collimator mounting means shown in FIGS. 1-12.

FIG. 12 shows the formation of desired azimuth angle 76 between unadjusted azimuth line 77 and adjusted azimuth line 78.

The collimator mounting means of this invention offers substantial advantages over prior collimator mounting means. The new collimator mounting means is adapted for attachment to the traversing unit of the missile launcher. This enables the collimator mounting means, and the collimator supported by the mounting means, to project simulated targets on an axis that is parallel to the boresight of the missile launch tube. Because the collimator mounting means is factory aligned so that the optical centerline of the collimator is parallel to the longitudinal centerline of the missile launch tube, any alignment error measured between the boresight of the optical sight and the optical centerline of the collimator is an accurate measurement of the misalignment between them.

With the collimator mounting means of this invention, the collimator attached to the mounting means projects simulated targets directly into the optical sights. The optical sights in turn provide electrical outputs that provide a measure of the degree of misalignment between the optical sight and the collimator and, as a result, between the optical sight and the missile launch tube itself.

In addition, the collimator mounting means permits the tilt, elevation and azimuth angles to be adjusted so that the simulated target projected by the collimator can be properly aligned with the optical axis of the visual telescope in the optical sight. Simulated infrared targets are also projected by the collimator on axes parallel to the visual simulated target. The electrical error signals produced by the two infrared trackers in the optical sight provide a measure of the angular misalignment between the two infrared trackers and the visual telescope in the optical sight.

What is claimed is:

1. An apparatus for mounting a collimator to check alignment of a missile launcher system, the missile launcher system including an optical sight and a traversing unit for receiving a missile launch tube, the apparatus comprising:
   means for receiving the collimator to mount the collimator;
   means for attaching the receiving means to the traversing unit;
   means for adjusting the elevation, tilt and azimuth of the collimator.

2. The apparatus of claim 1, said attaching means comprising a tubular portion having first and second ends, said tubular portion coupled at said first end to the traversing unit and at the second end to the receiving means.

3. The apparatus of claim 2, said attaching means further comprising plate means for receiving the tubular portion, said plate means having projections for engaging the traversing unit.

4. The apparatus of claim 1, said adjusting means comprising adjustable plates.

5. The apparatus of claim 1, said adjusting means comprising means for locking the elevation, tilt, and azimuth in a desired position.

6. The apparatus of claim 4, said adjustable means further comprising screw means for adjusting said plates.

7. An assembly for aligning a missile launcher system, the missile launcher system including an optical sight and a traversing unit for receiving a missile launch tube, the assembly comprising:
   means configured to attach to the traversing unit in place of said missile launch tube for aligning the missile launch tube relative to the optical sight.

8. The assembly of claim 7 further comprising means for adjusting the elevation, tilt, and azimuth of the assembly.

* * * * *